United States Patent [19]
Grube

[11] Patent Number: 5,816,530
[45] Date of Patent: Oct. 6, 1998

[54] STRUCTURAL LIFE MONITORING SYSTEM

[75] Inventor: Kenneth Peter Grube, N. Merrick, N.Y.

[73] Assignee: Northrop Grumman Corporation, Los Angeles, Calif.

[21] Appl. No.: 728,680

[22] Filed: Oct. 9, 1996

[51] Int. Cl.$^6$ .............................. B64D 47/00; G01B 5/30
[52] U.S. Cl. ............................ 244/1 R; 73/776; 364/508
[58] Field of Search ................................. 244/1 R, 129.1; 73/760, 762, 763, 767, 788, 789, 791, 799, 802, 808; 364/149, 150, 506, 508; 340/665

[56] References Cited

U.S. PATENT DOCUMENTS

| | | | |
|---|---|---|---|
| 3,596,269 | 7/1971 | Laska | 340/421 |
| 3,983,745 | 10/1976 | Juusola | 73/760 |
| 4,107,980 | 8/1978 | Crane et al. | 73/88 R |
| 4,164,874 | 8/1979 | Cassatt et al. | 73/799 |
| 4,179,940 | 12/1979 | Oertle et al. | 73/808 |
| 4,255,974 | 3/1981 | Dufrane et al. | 73/776 |
| 4,336,595 | 6/1982 | Adams et al. | 364/508 |
| 4,590,804 | 5/1986 | Brull | 73/762 |

*Primary Examiner*—Galen L. Barefoot
*Attorney, Agent, or Firm*—Terry J. Anderson; Karl J. Hoch, Jr.

[57] ABSTRACT

A method for measuring growth and magnitude of structural damage in a structure such as an airframe, as reflected by growth of a crack therein, by securing to a structural portion thereof at least one ligament assembly whose properties replicate such damage. The ligament assembly has a metallic load test coupon having a loading response substantially identical to a loading response of the structural portion and an artificial flaw simulating a metallurgical crack. The crack has a growth rate magnitude substantially identical to a magnitude of structural damage of the structural portion as such damage occurs. A crack growth measurement gage is in alignment with the crack of the test coupon and in communication with a recorder unit to record crack growth, and crack growth is compared to correlated structural damage of the structural portion as associated with such growth. The recorder unit preferably includes a data processor capable of comparing crack growth recorded by the recorder unit, correlating this growth to structural damage, reporting the structural damage as a viewable output correlated to the crack growth, and accruing crack-growth data. The method is particularly, but not limitedly, applicable for monitoring structural damage as it occurs to aging aircraft.

25 Claims, 2 Drawing Sheets

STRUCTURAL LIFE MONITORING SYSTEM

FIELD OF THE INVENTION

This invention relates in general to structural damage monitoring, and in particular to a method for measuring growth and magnitude of structural damage in a structure as reflected by growth of a crack therein by securing to the structure a ligament having an artificial flaw simulating a metallurgical crack whose magnitude and growth is directly correlated to the magnitude and growth of structural damage as it occurs.

BACKGROUND OF THE INVENTION

Monitoring the expected life of aging structures such as airframes of aircraft is a very important requirement for both safety and efficiency of operation. With respect to aircraft, for example, current life tracking systems generally rely on onboard flight data recorder information processed on the ground using test-derived damage algorithms to calculate accrued structural damage. Such calculations, which are performed on flight parameter data including load factor occurrences, accelerations, etc., accomplish the computation of incremental crack growth or cumulative fatigue damage to thereby monitor usage and remaining structural life. However, because this technique is dependent upon the accuracy of damage calculation methodology and usage prediction, its reliability with respect to real time damage prediction must be addressed and may require frequent updating, especially if aircraft being tracked are subject to significant usage variations as generally found in military utilization.

In view of the above limitations for general applicability of structural damage monitoring, it is apparent that methodology employing direct measurement of actual structural conditions will provide critical information relating to structural aging and attendant replacement requirements. In accord therewith, a primary object of the present invention is to provide a method for measuring growth and magnitude of damage to a structure, as reflected by growth of a crack therein, by securing to the structure a load test coupon having a crack therein whose growth during strain simulates structural damage to the structure with which it is associated.

Another object of the present invention is to provide a method for measuring such damage whereby a crack growth measurement gage is in alignment with the crack of the test coupon and the measurements therefrom are recorded and compared to correlated structural damage associated with such crack growth.

Still another object of the present invention is to provide a method for measuring such damage wherein a data processor capable of comparing crack growth recorded by the recorder unit correlates crack growth to structural damage, and reports the structural damage as a viewable output correlated to the crack growth.

These and other objects of the present invention will become apparent throughout the description thereof which now follows.

SUMMARY OF THE INVENTION

The present invention is a method for measuring growth and magnitude of structural damage in a structure as reflected by growth of a crack therein by securing to a structural portion thereof at least one ligament assembly whose properties replicate such damage. The ligament assembly comprises a metallic load test coupon having a loading response substantially identical to a loading response of the structural portion and an artificial flaw simulating a metallurgical crack substantially equivalent to structural damage already present in the structural portion. If the assembly is installed after the structure has already entered service, the load test coupon will be provided with a crack growth equal to or greater than expected or predicted actual structural damage already present because of such entry into service before installation of the coupon. Thus, for a particular installation, the load test coupon can be subjected to constant amplitude cycling to achieve a crack length commensurate with the expected or predicted crack size assumed for the real structure. The crack has a growth rate magnitude substantially identical to a magnitude of structural damage of the structural portion as such damage occurs. A crack growth measurement gage is in alignment with the crack of the test coupon and in communication with a recorder unit to record growth of the crack of the test coupon. Crack growth recorded by the recorder unit is compared to correlated structural damage of the structural portion as associated with such crack growth.

Preferably, the recorder unit has in addition to its recording capabilities a data processor capable of comparing crack growth recorded by the recorder unit, correlating this growth to structural damage, reporting the structural damage as a viewable output correlated to the crack growth, and accruing crack-growth data. Most preferably, the data processor is capable of predicting a next immediate increment of crack growth based on accrued crack-growth data. For greatest effectiveness, the structural portion should be a structurally critical area such as, in an aircraft for example, a main spar beam of a wing lower surface near its attachment site to the fuselage. The load test coupon can geometrically represent the actual condition of the structural portion to which it is secured, including such parameters as hole sizes, edge distances, and the like. Optionally, two ligament assemblies can be employed either side by side or wherein the structural portion is disposed between the two generally parallel coupons of the assemblies and the crack magnitudes of the two coupons are compared together such as by averaging to produce one set of crack growth data. Such dual measurement can help to compensate for any anomalous loading effects.

Applicability of the present inventive methodology to the monitoring of aircraft aging, whether commercial, military or private airplanes, can provide an effective safety program which can be carried out economically through ongoing preventive maintenance of individual aircraft and of fleet programs as aircraft thereof are compared to each other and to industry standards.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
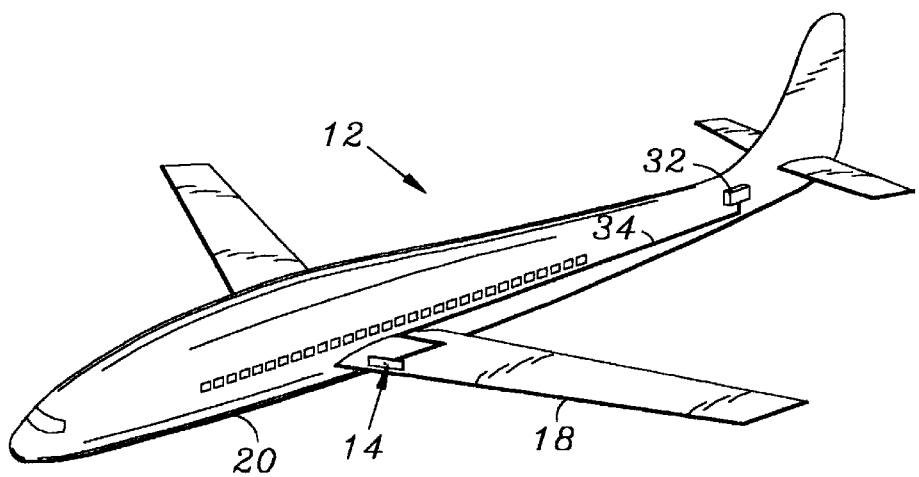
FIG. 1 is a schematic illustration not to scale of an aircraft structure with a structural portion of the airframe thereof illustrated as being monitored for structural damage.
Figure 2:
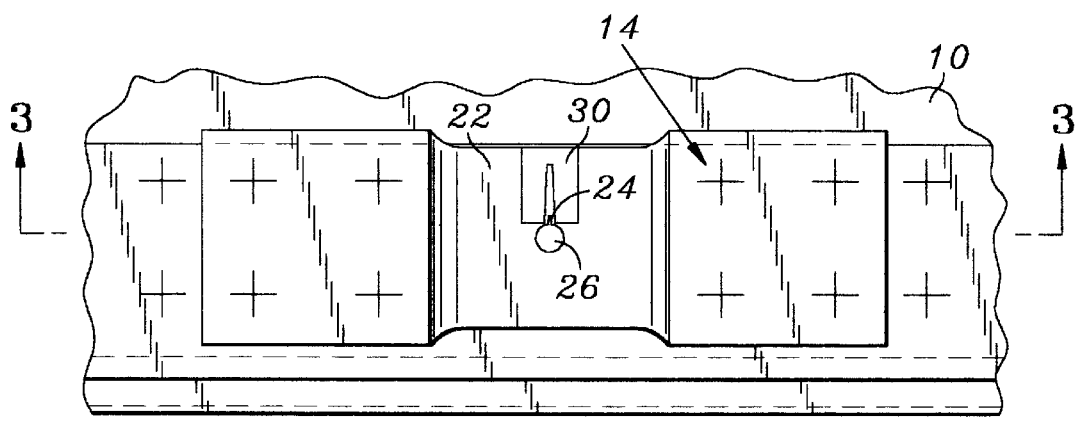
FIG. 2 is a top plan view of a ligament assembly secured to a structural portion of an airframe.
Figure 3:
FIG. 3 is an elevation view in section along line 3—3 of FIG. 2.

Referring to FIGS. 1–3, a structural portion 10 of an aircraft 12 is illustrated. As represented in FIG. 1, which is not to scale and is for illustrative purposes only, a ligament assembly 14, described below, is secured to the structural portion 10 which is a structurally critical area such as, for example, a main spar beam of a wing lower surface 18 near its attachment to a fuselage 20. The ligament assembly 14 comprises a metallic load test coupon 22 having a loading response substantially identical to a loading response of the structural portion 10 and an artificial flaw simulating a metallurgical crack 24 substantially equivalent to structural damage already present in the structural portion 10. The crack 24 has a growth rate magnitude substantially identical to a magnitude of structural damage of the structural portion as damage occurs. Securement of the ligament assembly 14 to the structural portion 10 can be accomplished by conventional cold bonding and can include mechanical fastening using existing holes of the structural portion in alignment with holes placed in the test coupon 22. As shown in FIG. 2, the test coupon 22 has a small-diameter central hole 26 and an artificial flaw simulating a metallurgical crack 24 at the edge of the hole 26 perpendicular to the long axis of the coupon 22. This artificial flaw is created in a two-step process, with the first step inserting a notch by utilizing a standard electrical discharge technique, and with the second step converting the notch to a crack by subjecting the coupon 22 to constant-amplitude cyclic loading using a standard test machine.

The ligament assembly 14 additionally includes a crack growth measurement gage such as a conventional electrical resistance crack growth measurement gage 30 which is bonded to the coupon 22 such that it is adjacent the hole 26 and in alignment with the crack 24 to which it is then calibrated. A conventional data recorder and processor unit 32 is in electrical communication through standard leads 34 with the electrical resistance crack growth measurement gage 30 and can be situated remotely from the ligament assembly 14. The unit 32 has the capability of accepting the gage resistance changes as the crack 24 grows in the coupon 22 under the strain cycling of the structural portion 10 to which it is attached for immediate display or for recording on a disk or tape to be subsequently played back by aircraft maintenance personnel.

Figure 4:
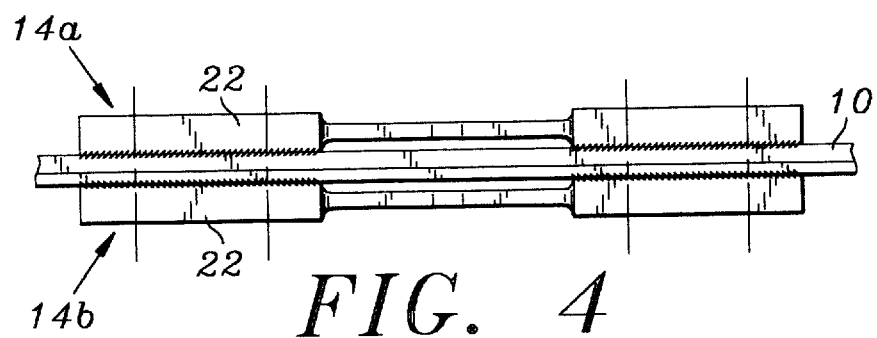
FIG. 4 is an elevation view similar to FIG. 3 except with two generally parallel identical ligament assemblies secured to an airframe and situated such that a structural portion of the airframe is between the ligament assemblies.
Figure 5:
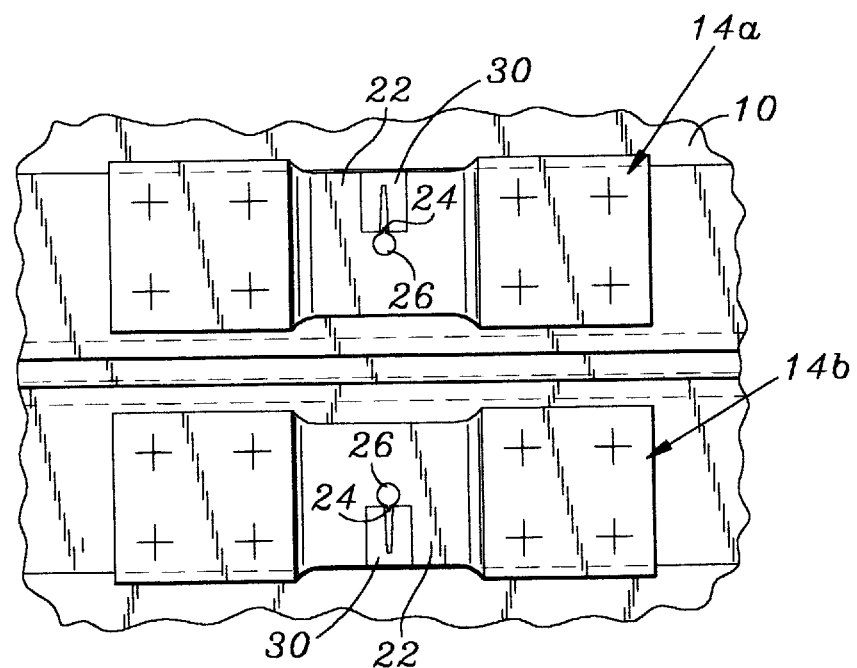
FIG. 5 is a top plan view of two identical ligament assemblies secured in side by side relationship to a structural portion of an airframe.

Referring now to FIGS. 4 and 5, employment of two identical ligament assemblies 14a and 14b, both identical to the ligament assembly 14 of FIGS. 1–3, permits comparative data analysis as well as processing to obtain, for example, an averaged reading. As shown in FIG. 4, two ligament assemblies 14a, 14b are substantially parallel to each other, with the structural portion 10 therebetween. As shown in FIG. 5, two ligament assemblies 14a, 14b are situated adjacent each other on one side of the structural portion 10. Securement of the assemblies 14a, 14b to the structural portion 10 is the same as described in relation to FIGS. 1–3, with data from each crack growth measurement gage 30 of the assemblies 14a, 14b transmitted to the data recorder and processor unit 32 for processing as directed.

In operation, and as earlier noted, the load test coupon 22 experiences substantially the exact same strain level excursions as the structural portion 10 to which it is attached. In turn, depending upon these strain levels and their frequency of occurrence, the flaw in the coupon 22 propagates as a fatigue crack 24. The crack measurement gage 30 detects incremental crack growth and the recorder and processor unit 32 records and transfers the signal to a disk or tape cartridge. The recording medium has the capacity of storing many hours of crack growth data. At specified intervals, the stored data can be displayed or printed in the form of a scaled plot depicting crack length versus flight hours. A more aggressive review of data can be provided through immediate display of crack growth at the end of each flight, block of flights, or selected time interval, and can show not only cumulative values, but also incremental amounts of crack growth over a measurement unit. In addition to downloading of data onto disk or tape media, the data may be accessed directly by connection of a computer such as a lap top model into the recorder and processor unit 32. Additionally, the recorder and processor unit 32 can be provided with input ports and processing capability to match load factor events for synchronization against crack growth in addressing changes in crack growth rates attributable to load effects. The recorder and processor unit 32 optionally can be configured to predict the next immediate increment of crack growth based upon accrued growth data. As is apparent, the availability of this data can beneficially aid in planning inspection schedules, preventive maintenance work, and component replacement.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for monitoring growth and magnitude of structural damage of a structural portion of a structure as reflected by growth of a crack therein, the method comprising:

a) simulating structural damage present in the structural portion with a load test coupon secured to the structural portion, said load test coupon having a loading response substantially identical to a loading response of the structural portion and a crack substantially equivalent to structural damage already present in the structural portion, said crack in the load test coupon having a growth rate magnitude substantially identical to a magnitude of structural damage of the structural portion as said damage occurs and having in alignment therewith a crack growth measurement gage;

b) recording growth of the crack of the test coupon with a recorder unit in communication with the crack growth measurement gage; and c) comparing crack growth recorded by the recorder unit to correlated structural damage of the structural portion associated with such crack growth.

2. A method as claimed in claim 1 wherein the structural portion to which the load test coupon is secured is a portion of an airframe of an aircraft.

3. A method as claimed in claim 2 wherein the recorder unit has in addition a data processor capable of comparing crack growth recorded by the recorder unit, correlating said growth to structural damage, reporting the structural damage as a viewable output correlated to the crack growth, and accruing crack-growth data.

4. A method as claimed in claim 3 wherein the data processor is capable of predicting a next immediate increment of crack growth based on accrued crack-growth data.

5. A method as claimed in claim 4 wherein the structural portion is a structurally critical area.

6. A method as claimed in claim 5 wherein the structurally critical area is a main spar beam of a wing lower surface near its attachment to a fuselage.

7. A method as claimed in claim 1 wherein the recorder unit has in addition a data processor capable of comparing crack growth recorded by the recorder unit, correlating said growth to structural damage, reporting the structural damage as a viewable output correlated to the crack growth, and accruing crack-growth data.

8. A method as claimed in claim 1 wherein the data processor is capable of predicting a next immediate increment of crack growth based on accrued crack-growth data.

9. A method as claimed in claim 1 wherein the structural portion is a structurally critical area.

10. A method for monitoring growth and magnitude of structural damage of a structural portion of a structure as reflected by growth of a crack therein, the method comprising:
   a) simulating structural damage present in the structural portion with two load test coupons secured to the structural portion such that the load test coupons are either in a generally parallel relationship with the structural portion therebetween or in a side by side relationship, each of said load test coupons having a loading response substantially identical to a loading response of the structural portion and a crack substantially equivalent to structural damage already present in the structural portion, said crack in the load test coupon having a growth rate magnitude substantially identical to a magnitude of structural damage of the structural portion as said damage occurs and having in alignment therewith a crack growth measurement gage;
   b) recording growth of each crack of each test coupon with a recorder unit in communication with the crack growth measurement gage; and
   c) comparing crack growth of each test coupon recorded by the recorder unit to correlated structural damage of the structural portion associated with such crack growth.

11. A method as claimed in claim 10 wherein the structural portion to which the load test coupon is secured is a portion of an airframe of an aircraft.

12. A method as claimed in claim 11 wherein crack growths from both test coupons are averaged to correlate structural damage of the structural portion.

13. A method as claimed in claim 12 wherein the recorder unit has in addition a data processor capable of comparing crack growth recorded by the recorder unit, correlating said growth to structural damage, reporting the structural damage as a viewable output correlated to the crack growth, and accruing crack-growth data.

14. A method as claimed in claim 13 wherein the data processor is capable of predicting a next immediate increment of crack growth based on accrued crack-growth data.

15. A method as claimed in claim 14 wherein the structural portion is a structurally critical area.

16. A method as claimed in claim 15 wherein the structurally critical area is a main spar beam of a wing lower surface near attachment to a fuselage.

17. A method as claimed in claim 10 wherein the recorder unit has in addition a data processor capable of comparing crack growth recorded by the recorder unit, correlating said growth to structural damage, reporting the structural damage as a viewable output correlated to the crack growth, and accruing crack-growth data.

18. A method as claimed in claim 10 wherein the data processor is capable of predicting a next immediate increment of crack growth based on accrued crack-growth data.

19. A method as claimed in claim 10 wherein the structural portion is a structurally critical area.

20. A structural damage monitoring system for monitoring growth and magnitude of structural damage of a structural portion of a structure as reflected by growth of a crack therein, the system comprising:
   a) a ligament assembly securable to the structural portion, the ligament assembly comprising:
      i) a metallic load test coupon having a loading response substantially identical to a loading response of the structural portion and an artificial flaw simulating a metallurgical crack substantially equivalent to structural damage already present in the structural portion, said crack having a growth rate magnitude substantially identical to a magnitude of structural damage of the structural portion as said damage occurs; and
      ii) a crack growth measurement gage in alignment with the crack of the test coupon;
   b) a recorder unit in communication with the crack growth measurement gage for recording growth of the crack of the test coupon; and
   c) a data processor capable of comparing crack growth recorded by the recorder unit, correlating said growth to structural damage, and reporting the structural damage as a viewable output correlated to the crack growth.

21. A structural damage monitoring system as claimed in claim 20 wherein the data processor is capable of accruing crack-growth data.

22. A structural damage monitoring system as claimed in claim 21 wherein the data processor is capable of predicting a next immediate increment of crack growth based on accrued crack-growth data.

23. A structural damage monitoring system for monitoring growth and magnitude of structural damage of a structural portion of a structure as reflected by growth of a crack therein, the system comprising:
   a) two ligament assemblies securable to the structural portion either in a generally parallel relationship with the structural portion therebetween or in a side by side relationship, each ligament assembly comprising
      i) a metallic load test coupon having a loading response substantially identical to a loading response of the structural portion and an artificial flaw simulating a metallurgical crack substantially equivalent to structural damage already present in the structural portion, said crack having a growth rate magnitude substantially identical to a magnitude of structural damage of the structural portion as said damage occurs; and
      ii) a crack growth measurement gage in alignment with the crack of the test coupon;
   b) a recorder unit in communication with the crack growth measurement gage for recording growth of the crack of the test coupon; and
   c) a data processor capable of comparing crack growth recorded by the recorder unit, correlating said growth to structural damage, and reporting the structural damage as a viewable output correlated to the crack growth.

24. A structural damage monitoring system as claimed in claim 23 wherein the data processor is capable of accruing crack-growth data.

25. A structural damage monitoring system as claimed in claim 24 wherein the data processor is capable of predicting a next immediate increment of crack growth based on accrued crack-growth data.

* * * * *